US007302991B2

(12) United States Patent
Chang et al.

(10) Patent No.: US 7,302,991 B2
(45) Date of Patent: Dec. 4, 2007

(54) FUGITIVE PATTERN FOR CASTING

(75) Inventors: Dane Chang, Sugar Land, TX (US); Yunwa W. Cheung, Lake Jackson, TX (US); Charles F. Diehl, Lake Jackson, TX (US); Joseph M. Vihtelic, Whitehall, MI (US)

(73) Assignees: Howmet Research Corporation, Whitehall, MI (US); Dow Global Technologies, Inc., Midland, MI (US)

( * ) Notice: Subject to any disclaimer, the term of this patent is extended or adjusted under 35 U.S.C. 154(b) by 15 days.

(21) Appl. No.: 11/260,326

(22) Filed: Oct. 27, 2005

(65) Prior Publication Data

US 2006/0052499 A1   Mar. 9, 2006

Related U.S. Application Data

(62) Division of application No. 10/374,773, filed on Feb. 25, 2003.

(51) Int. Cl.
*B22C 7/00* (2006.01)

(52) U.S. Cl. .......................................... 164/45; 524/274
(58) Field of Classification Search .................. 164/45; 524/274
See application file for complete search history.

(56) References Cited

U.S. PATENT DOCUMENTS

| 2,961,751 | A |   | 11/1960 | Operhall et al. ............... 22/196 |
| 3,196,506 | A |   | 7/1965  | Operhall et al. ............... 22/196 |
| 3,996,991 | A |   | 12/1976 | Ugata et al. ................... 164/35 |
| 4,076,698 | A |   | 2/1978  | Anderson et al. ........ 526/348.6 |
| 4,763,715 | A | * | 8/1988  | Cannarsa et al. ............. 164/45 |
| 5,372,768 | A | * | 12/1994 | Solomon ..................... 264/221 |
| 5,703,187 | A |   | 12/1997 | Timmers ..................... 526/282 |
| 5,869,591 | A |   | 2/1999  | McKay et al. ............... 526/347 |
| 5,872,201 | A |   | 2/1999  | Cheung et al. ............. 526/282 |
| 5,911,940 | A |   | 6/1999  | Walton et al. ............... 264/415 |
| 5,919,983 | A |   | 7/1999  | Rosen et al. ..................... 568/3 |
| 5,977,271 | A |   | 11/1999 | McKay et al. ............... 526/170 |
| 6,015,868 | A |   | 1/2000  | Nickias et al. ............... 526/177 |
| 6,048,909 | A |   | 4/2000  | Chaudhary et al. ........... 521/81 |
| 6,118,013 | A |   | 9/2000  | Devore ......................... 556/11 |
| 6,124,370 | A |   | 9/2000  | Walton et al. ............... 521/143 |
| 6,150,297 | A |   | 11/2000 | Campbell, Jr. et al. ..... 502/152 |
| 6,191,245 | B1 |  | 2/2001  | Campbell, Jr. et al. ..... 526/347 |
| 6,231,795 | B1 |  | 5/2001  | Chaudhary et al. ........... 264/53 |
| 6,344,515 | B1 |  | 2/2002  | Parikh et al. ................ 524/578 |
| 6,476,141 | B1 |  | 11/2002 | Chang et al. ................ 525/191 |
| 6,524,702 | B1 |  | 2/2003  | Betso et al. ................. 428/379 |
| 6,648,060 | B1 | * | 11/2003 | Yang .......................... 164/519 |
| 2005/0165192 | A1 | * | 7/2005 | Rosen et al. ................ 526/346 |

FOREIGN PATENT DOCUMENTS

| CA | 962430  | 2/1975  |
| EP | 0765888 | 4/1997  |
| EP | 0416815 | 9/1997  |
| RU | 2182057 | 5/2002  |
| WO | 94/00500 | 1/1994 |
| WO | 95/32095 | 11/1995 |

OTHER PUBLICATIONS

J. C. Randall; Polymer Sequence Determination; Academic Pres New York; 1977; pp. 71-78.

* cited by examiner

*Primary Examiner*—Peter D. Mulcahy

(57) ABSTRACT

A fugitive pattern for making a shell mold for investment casting a metal or alloy comprises a substantially random interpolymer and a low molecular weight polymer in proportions to provide a fugitive pattern having a combination of properties suitable for use in making the shell molds.

20 Claims, 6 Drawing Sheets

FUGITIVE PATTERN FOR CASTING

This application is a division of U.S. Ser. No. 10/374,773 filed Feb. 25, 2003, and claims priority and benefits thereof.

FIELD OF THE INVENTION

The invention relates to investment casting of metals and alloys and, in particular, to pattern materials and fugitive patterns for use making shell molds for investment casting.

BACKGROUND OF THE INVENTION

In the well known "lost wax" process of investment casting, a fugitive or disposable pattern, such as a wax, polystyrene or other commonly used fugitive pattern material, of the article to be cast is made by injection molding a fluid pattern material in a die corresponding to the configuration of the article to be cast. That is, the fugitive pattern is a replica of the article to be cast. In high production commercial investment casting operations, a plurality of fugitive patterns typically are attached to a central fugitive sprue and pour cup to form a gang or cluster pattern assembly. The pattern assembly then is invested in a ceramic shell mold by repeatedly dipping the pattern in a ceramic slurry having ceramic flour carried in a liquid binder, draining excess slurry, stuccoing the slurry layer while it is wet with coarser ceramic particles or stucco, and then drying in air or controlled atmosphere until a desired thickness of a ceramic shell mold is built-up on the pattern. The initial ceramic slurry and stucco layers (e.g. the initial two layers) form what is called a facecoat of the shell mold for contacting the molten metal or alloy to be cast.

Once a shell mold of desired wall thickness is built up on the pattern assembly, the pattern assembly is removed from the green shell mold typically by a thermal treatment to selectively melt out the pattern assembly, leaving a ceramic shell mold having a plurality of mold cavities with the shape of each fugitive pattern. One common pattern removal technique involves subjecting the green shell mold/pattern assembly to a flash dewaxing step where the green shell mold/pattern assembly is placed in an oven at elevated temperature to rapidly melt the pattern from the green shell mold. Another pattern removal technique involves positioning the green shell mold/pattern assembly in a steam autoclave where steam at elevated temperature and pressure is used to rapidly melt a wax pattern from the green shell mold. In the manufacture of conventional ceramic shell molds by the lost wax process using wax or polystyrene patterns can be prone to mold cracking or splitting during the pattern removal operations described above as a result of internal thermal stresses applied on the green shell mold as the fugitive pattern is rapidly heated and melted. Mold splitting or cracking must be avoided during the pattern removal process so as to produce a shell mold acceptable for receiving molten metal or alloy.

Following pattern removal, the shell mold is fired at elevated temperature to remove pattern residue and to develop appropriate mold strength for casting a molten metal or alloy. Both the investment casting process and the lost wax shell mold building process are well known, for example, as is apparent from the Operhall U.S. Pat. Nos. 3,196,506 and 2,961,751 as well as numerous other patents. The ceramic shell mold typically is cast with molten metal or alloy by pouring the molten material into a funnel-shaped pour cup of the shell mold and flowing the molten material by gravity down a sprue channel, through gates and into the mold cavities. The molten metal or alloy solidifies in the mold to form the desired cast articles in the mold cavities. That is, the cast articles assume the shape of the mold cavities, which have the shape of the initial fugitive patterns. The cast articles are connected to solidified gates, sprue and pouring cup. The ceramic shell mold then is removed, and the cast articles are cut or otherwise separated from the solidified gates and subjected to one or more finishing and inspecting operations before being shipped to a customer.

The above described lost wax investment casting process is in widespread use in casting gas turbine engine components, such as turbine blades and vanes (referred to as "airfoils") from nickel and cobalt based superalloys. Attempts have been made in casting such components to form fugitive patterns from materials other than multi-component wax blends which are currently in widespread use. For example, attempts have been made to use molded polystyrene or polyurethane foam for practice of the lost wax process to make ceramic shell molds. However, polystyrene or polyurethane foam patterns exhibit shortcomings with respect to pattern surface quality, pattern strength, and difficulty in removal of the pattern from a shell mold invested therearound without cracking of the shell mold.

SUMMARY OF THE INVENTION

The present invention provides a pattern material for use in making a fugitive pattern or replica of an article to be cast of a metal or alloy mold. The pattern material comprises a first component A comprising a substantially random interpolymer, preferably containing from about 1 to about 65 mole percent of at least one vinyl or vinylidene aromatic monomer and an additional monomer especially $C_2$ to $C_{20}$ α-olefins, a second component B comprising a polymer other than component A, preferably a low molecular weight polymer, such as preferably based on polystyrene, and an optional third component C comprising one or more thermoplastic polymers or other materials typically present as a filler in the pattern material.

In an illustrative embodiment of the invention, the proportions of components A, B, and optionally C are selected to provide a pattern material injection moldable to form a fugitive pattern having a combination of properties suitable for use in making a shell mold for the lost wax investment casting process. For example, for purposes of illustration and not limitation, the pattern material comprises an ethylene/styrene interpolymer as component A and a low molecular weight polystyrene as component B in proportions selected to provide suitable pattern shrinkage rate for fast, low cost injection molding with suitable visual surface quality; improved pattern mechanical properties to maintain pattern dimensional stability to meet 6-sigma manufacturing requirements in an automated shell mold-making operation; suitable melting temperature, melt flow rate, and thermal expansion coefficient to permit pattern removal from the shell mold using conventional rapid pattern thermal removal techniques without mold splitting or cracking; and clean burnout (low ash) from the shell mold. The pattern material is used to make a fugitive pattern of an article to be cast that is invested in a shell mold and then removed from the shell mold for use of the shell mold in casting of a molten metallic material therein. The above pattern material also may be used to make a fugitive pattern of an article to be cast that is used in the lost foam or other casting process where the fugitive pattern is destroyed and replaced by molten metallic material to be cast.

The above advantages of the present invention will become more readily apparent from the following drawings taken with the following detailed description of the invention.

DETAILED DESCRIPTION OF THE INVENTION.

Figure 1:
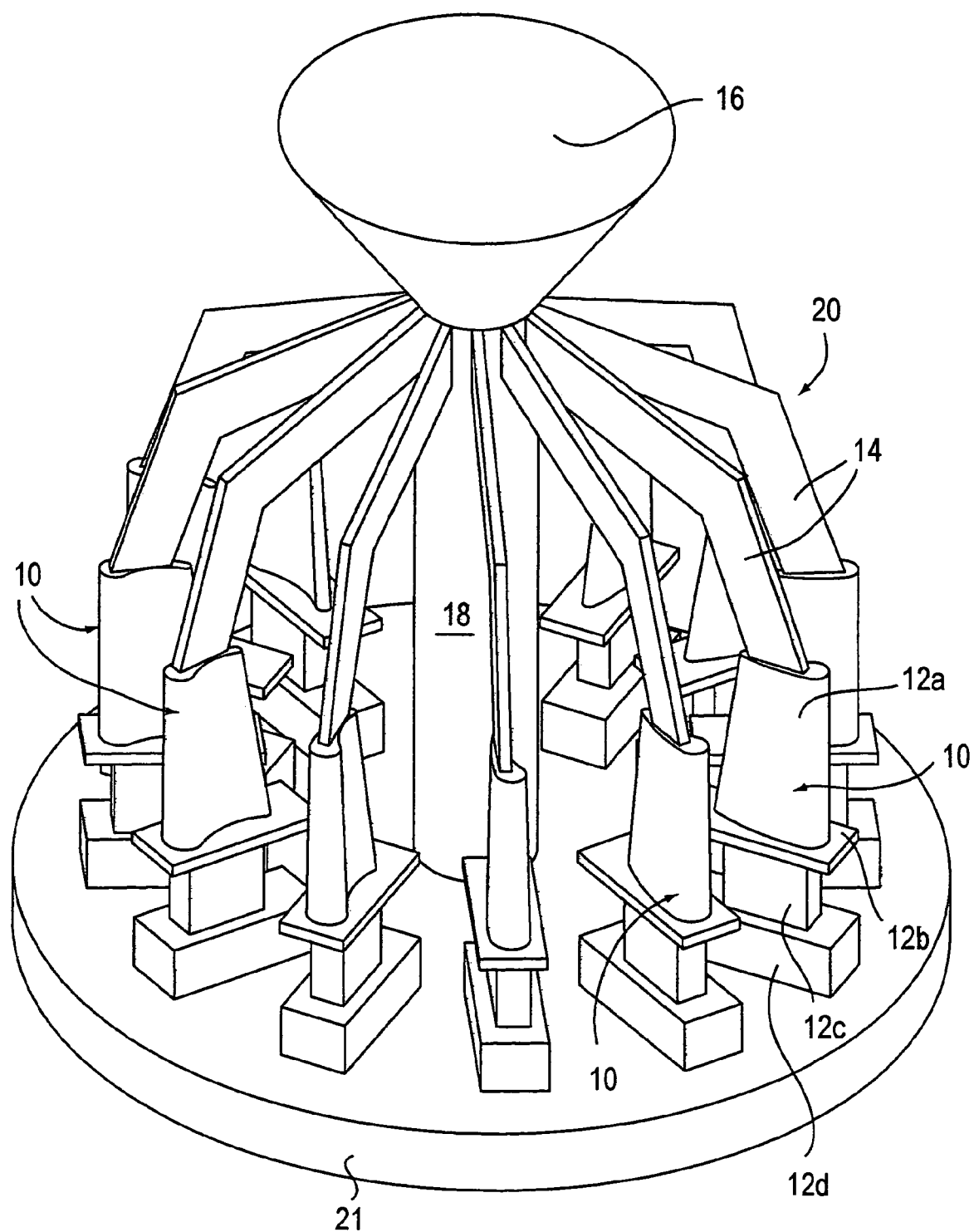
FIG. 1 is a perspective view of a pattern assembly for a gang or cluster mold.
Figure 2:
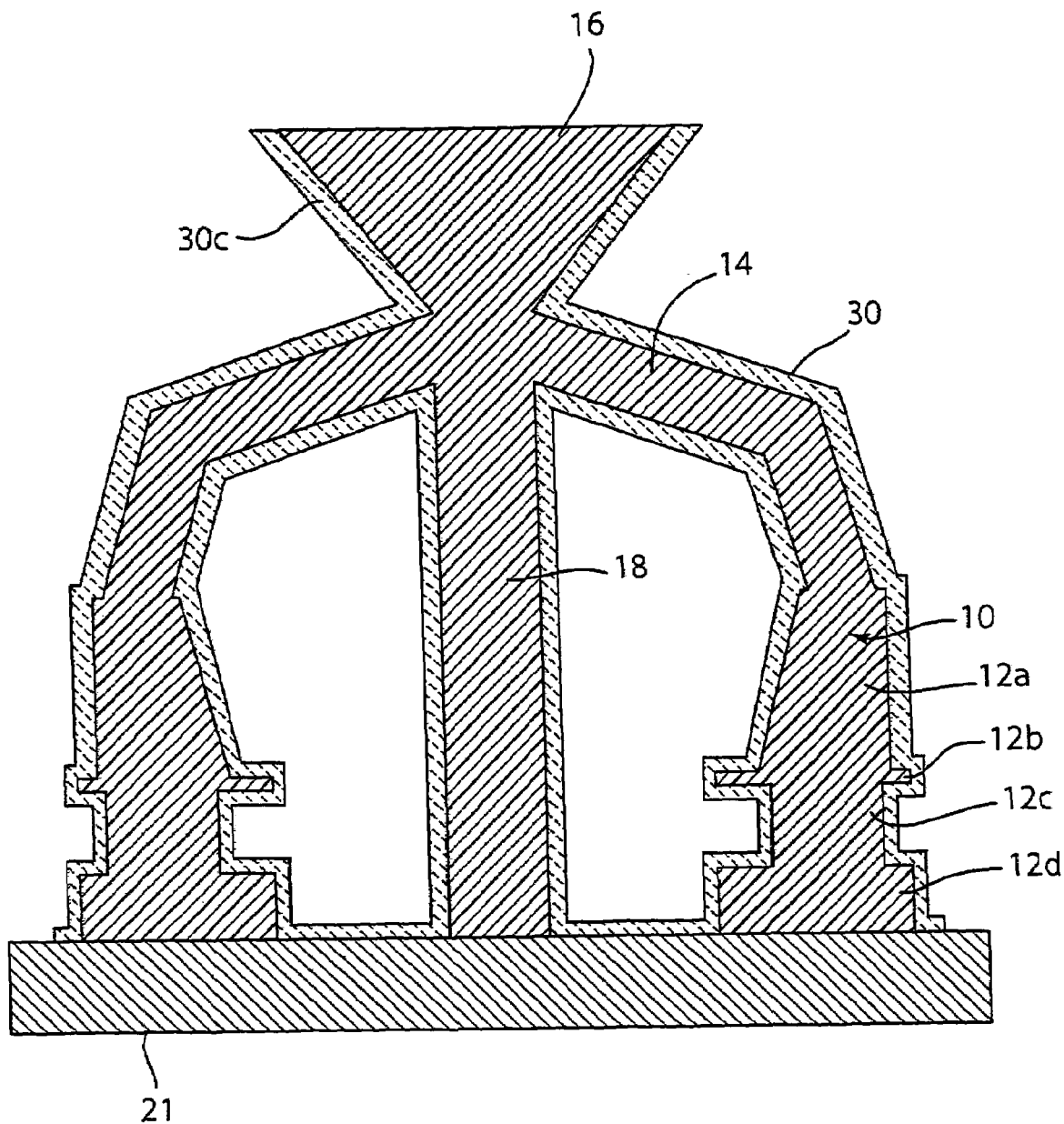
FIG. 2 is a cross-sectional view of the pattern assembly of FIG. 1 invested in a ceramic shell mold.
Figure 3:
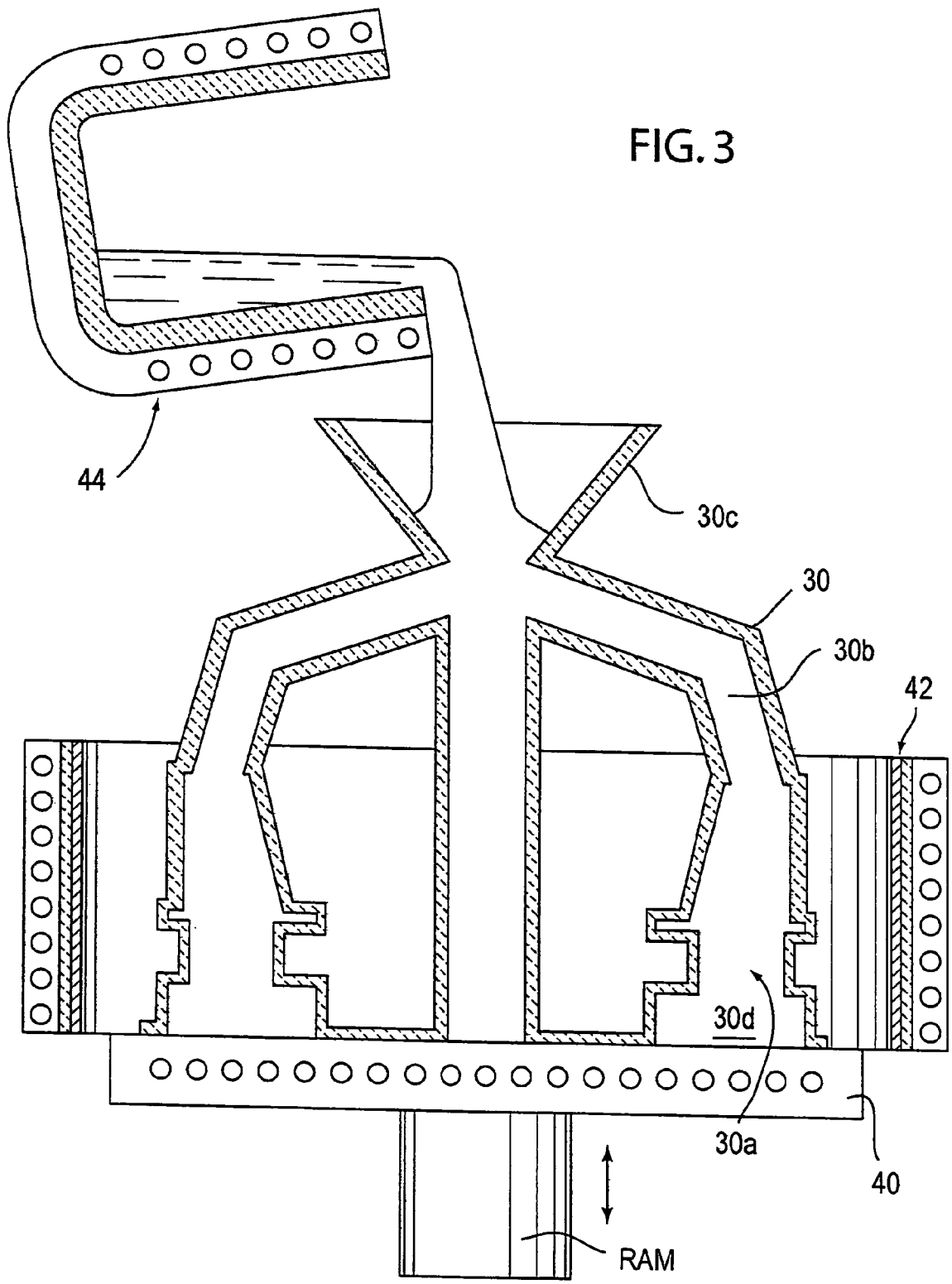
FIG. 3 is a cross-sectional view of the ceramic shell mold after the pattern assembly is removed and in position in a casting furnace to receive molten metallic material from a crucible.

The present invention is illustrated herebelow with respect to a pattern material useful for making a fugitive pattern for use in the lost wax investment casting process as illustrated in FIGS. 1, 2 and 3. In particular, the pattern material pursuant to the invention is injected molded or otherwise molded to form a plurality of fugitive patterns 10 having the shape of the article to be cast. In FIG. 1, the patterns 10 are shown as having a shape of a gas turbine engine blade with an airfoil section 12a, a platform section 12b, and a root section 12c, although the invention can be used to make any pattern shape desired. The patterns 10 are joined to a respective fugitive sprue-forming elements 14, which in turn is joined to a lower region of a frusto-conical pour cup-forming element 16 to form a gang or cluster pattern assembly 20. The pour cup-forming element 16 is supported by an upstanding fugitive post element 18 on metal, plastic or other support base 21. The elements 14, 16, 18 can be formed by injection molding or extrusion of the same fugitive material as the patterns 10, or of a different material such as paraffin wax, utility wax, and other suitable fugitive materials. The patterns 10 and elements 14, 16, 18 are joined to one another using wax welding, hot glue adhesive, hydrocarbon resin adhesive and/or solvent bonding materials. The complete pattern assembly 20 is shown in FIG. 1.

The pattern assembly 20 is invested in a ceramic shell mold 30, FIG. 2, by repeatedly dipping the pattern in a ceramic slurry having ceramic flour carried in a liquid binder, draining excess slurry, stuccoing the slurry layer while it is wet with coarser ceramic particles or stucco, and then drying in air or controlled atmosphere until a desired thickness of a ceramic shell mold 30 is built-up on the pattern pursuant to the well-known lost wax process. Once a green (i.e. unfired) shell mold 30 of desired wall thickness is built up on the pattern assembly 20, the pattern assembly is removed from the green shell mold typically by a thermal treatment to selectively melt out the pattern assembly 20, leaving a ceramic shell mold 30 having a plurality of mold cavities 30a with the shape of each fugitive pattern, FIG. 3. Each mold cavity 30a is communicated to a respective sprue 30b, which in turn is communicated to a lower region of the pour cup 30c of the mold assembly. Each mold cavity 30a also is communicated to an optional lowermost grain starter cavity 30d that replicates a lowermost part 12d of each pattern 10 with part 12d being integral or separate from each pattern and attached thereto by adhesive.

After the green mold assembly 30 is invested about the pattern assembly 20, the pattern assembly is removed by a conventional fast thermal treatment, such as a flash dewaxing treatment where the green shell mold/pattern assembly is placed in an oven (not shown) at elevated temperature (e.g. 1500 degrees F.) to rapidly melt the fugitive pattern assembly from the green shell mold or a steam autoclaving treatment where the shell mold/pattern asembly is positioned in a steam autoclave in which steam at elevated temperature and pressure is used to rapidly melt the pattern assembly from the green shell mold. Other pattern removal processes may be used to remove the pattern assembly 20 from the shell mold 30.

Following pattern assembly removal, the mold assembly 30 is fired at elevated temperature to remove pattern residue and to develop appropriate mold strength for casting a molten metal or alloy using conventional firing temperatures and times. The shell mold assembly 30 after the pattern assembly 20 has been removed and after elevated temperature firing is shown in FIG. 3. The mold assembly 30 is shown positioned on a chill plate 40 in a conventional directional solidification casting furnace 42 in position to receive molten metal or alloy from induction melting crucible 44. When molten metal or alloy is poured from crucible 44 into the mold pour cup 30c, it flows from the pour cup 30c through the sprues 30b into each mold cavity 30a and associated starter cavity 30d where numerous grains are nucleated and grow upwardly as a result of contact of the molten metal or alloy with the chill plate 40. The grains grow upwardly through the molten metal or alloy in the mold cavity 30a to form a columnar grain cast turbine blade as is well known. Single crystal turbine blades can be made in each mold cavity 30a by placing a seed (not shown) in the grain starter cavity 30d and a crystal selector passage (not shown) between the seed and the mold cavity 30a as is well known. The invention is not limited for use in making shell molds for directional solidification casting processes and can be used in conventional casting processes employed to make equiaxed grain castings using shell molds that do not have or need a grain starter cavity 30d.

A fugitive pattern material pursuant to an embodiment of the invention for use in making patterns 10 as well as optionally elements 14, 16, 18 comprises a first component A comprising a substantially random interpolymer, preferably having from about 1 to about 65 mole percent of at least one vinyl or vinylidene aromatic monomers and an additional monomer especially $C_2$ to $C_{20}$ α-olefins, a second component B preferably comprising a very low molecular weight polymer, more preferably a low molecular weight polystyrene, and an optional third component C that may comprise one or more thermoplastic polymers typically present as a filler in the pattern material. The proportions of components A, B, and optionally C are selected to provide a pattern material having a combination of properties including a suitable pattern shrinkage rate for fast, low cost injection molding with suitable visual surface quality; improved pattern mechanical properties to maintain pattern dimensional stability to meet 6-sigma manufacturing requirements in an automated shell mold-making operation; suitable melting temperature, melt flow rate, and thermal expansion coefficient to permit pattern removal from the shell mold using conventional rapid pattern thermal removal techniques without mold splitting or cracking; and clean burnout (low ash) from the shell mold.

Definitions of Components.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

The Term "interpolymer" is used herein to indicate a polymer wherein at least two different monomers are polymerized to make the interpolymer. This includes copolymers, terpolymers, etc.

The term "substantially random" (in the substantially random interpolymer comprising polymer units derived from one or more α-olefin monomers with one or more vinyl or vinylidene aromatic monomers and/or a hindered aliphatic or cycloaliphatic vinyl or vinylidene monomers) as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71-78. Preferably, substantially random interpolymers do not contain more than 15 percent of the total amount of vinyl or vinylidene aromatic monomer in blocks of vinyl or vinylidene aromatic monomer of more than 3 units.

More preferably, the interpolymer is not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The Substantially Random Interpolymers.

The interpolymers used to prepare the pattern material and fugitive injection molded pattern of the present invention include interpolymers prepared by polymerizing one or more α-olefins with one or more vinyl or vinylidene aromatic monomers and/or one or more hindered aliphatic or cycloaliphatic vinyl or vinylidene monomers.

Suitable α-olefins include for example, α-olefins containing from 2 to about 20, preferably from 2 to about 12, more preferably from 2 to about 8 carbon atoms. Particularly suitable are ethylene, propylene, butene-1, 4-methyl-1-pentene, hexene-1 or octene-1 or ethylene in combination with one or more of propylene, butene-1, 4-methyl-1-pentene, hexene-1 or octene-1. These α-olefins do not contain an aromatic moiety.

Suitable vinyl or vinylidene aromatic monomers which can be employed to prepare the interpolymers include, for example, those represented by the following formula:

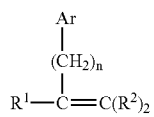

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary vinyl or vinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_{1-C4}$) or phenyl-ring substituted derivatives of styrene, such as for example, ortho-, meta-, and para-methylstyrene, the ring halogenated styrenes, para-vinyl toluene or mixtures thereof, and the like. A more preferred aromatic monovinylidene monomer is styrene.

By the term "hindered aliphatic or cycloaliphatic vinyl or vinylidene compounds", it is meant addition polymerizable vinyl or vinylidene monomers corresponding to the formula:

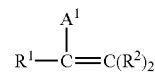

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. Most preferred hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers may also be modified by various cross-linking processes including, but not limited to peroxide-, silane-, sulfur-, radiation-, or azide-based cure systems. A full description of the various cross-linking technologies is described in U.S. Pat. Nos. 5,869,591 and 5,977,271, the entire contents of both of which are herein incorporated by reference.

Dual cure systems, which use a combination of heat, moisture cure, and radiation steps, may be effectively employed. Dual cure systems are disclosed and claimed in U.S. Pat. Nos. 5,911,940 and 6,124,370, both of which also incorporated herein by reference. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc.

The substantially random interpolymers may also be modified by various cross-linking processes including, but not limited to the incorporation of a diene component as a termonomer in its preparation and subsequent cross linking by the aforementioned methods and further methods including vulcanization via the vinyl group using sulfur for example as the cross linking agent.

The substantially random interpolymers include the pseudo-random interpolymers as described in EP-A-0,416,815 and EP-A-0,765,888 by James C. Stevens et al. and U.S. Pat. No. 5,703,187 by Francis J. Timmers, both of which are incorporated herein by reference in their entirety. The substantially random interpolymers also include the substantially random terpolymers as described in U.S. Pat. No. 5,872,201 which is incorporated herein by reference in its entirety. Also suitable are the substantially random interpolymers, which comprise at least one α-olefin/vinyl aromatic/vinyl aromatic/α-olefin tetrad disclosed in U.S. Pat. No. 6,191,245 B1 also incorporated herein by reference in its entirety.

The substantially random interpolymers can be prepared by polymerizing a mixture of polymerizable monomers in the presence of one or more metallocene or constrained geometry catalysts in combination with various cocatalysts. Preferred operating conditions for the polymerization reactions are pressures from atmospheric up to 3000 atmospheres and temperatures from −30° C. to 200° C. Examples of processes used to prepare the substantially random interpolymers are described in U.S. Pat. Nos. 6,048,909 and 6,231,795 B1, the contents of which are incorporated herein by reference in their entirety.

Examples of suitable catalysts and methods for preparing the substantially random interpolymers are disclosed in EP-A-0,416,815; EP-A-514,828 (U.S. Pat. No. 6,118,013); EP-A-520,732 (U.S. Pat. No. 5,721,185); as well as U.S. Pat. Nos.: 5,055,438; 5,057,475; 5,096,867; 5,064,802; 5,132,380; 5,189,192; 5,321,106; 5,347,024; 5,350,723; 5,374,696; and 5,399,635; 5,470,993; 5866,704; 5,959,047; 6150,297; and 6,015,868; all of which US patents are incorporated herein by reference.

While preparing the substantially random interpolymer, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the interpolymer if desired, by extraction techniques such as selective precipitation from solution with a non solvent for either the interpolymer or the vinyl or vinylidene aromatic homopolymer. For the purpose of the present invention it is preferred that no more than 20 weight percent, preferably less than 15 weight percent based on the total weight of the interpolymers of atactic vinyl or vinylidene aromatic homopolymer is present.

The substantially random α-oelfin/vinyl or vinylidene aromatic interpolymres can also be prepared by the methods described in JP 07/278230, or by the methods described by John G. Bradfute et al. (W. R. Grace & Co.) in WO 95/32095; by R. B. Pannell (Exxon Chemical Patents Inc.) in Wo 94/00500; and in *Plastics Technology*, p. 25, (September 1992), all of which are incorporated herein by reference in their entirety.

Pattern Material

Component A comprises one or more substantially random interpolymers that preferably comprise one or more vinyl or vinylidene aromatic monomers (from 1 to 65 mol %, preferred range 10 to 60 mol %, most preferred range of 30 to 50 mol %) and additional monomers. The preferred additional monomers are ethylene; or a combination of ethylene and at least one of propylene, 4-methyl, 1 pentene, butene-1, hexene-1, octene-1 or norbornene.

Component B comprises one or more low MW (molecular weight) polymers such as for example a low molecular weight polystyrene (PS), tackifier resin, or wax, with average molecular weight (Mn) <10,000, preferably <5,000, most preferably <2,000.

Optional component C comprises a thermoplastic polymer with melt flow rate (MFR) (ASTM D1238, 200C, 5 Kg) greater than 100, preferably greater than 200 and most preferably greater than 300 gm/10 minute. Also or in addition, component C can include additives that include, but are limited to, antioxidants (e.g. hindered phenols such as, for example, Irganox® 1010), phosphites (e.g., Irgafos® 168), u.v. stabilizers, cling additives (e.g., polyisobutylene), anti-block additives, colorants, pigments, fillers, and the like, to the extent that they do not interfere with achievement of pattern properties. Organic fillers such as BPA (Bisphenol A), cross-linked polystyrene, ground polystyrene or acrylics particles may be included in a collective amount from 0 to 40 weight %.

The pattern material comprises blends of components A, B and optionally C in proportions to provide a combination of pattern properties suitable for use in making mold assembly 30 for use in the lost wax investment casting process. The proportions to this end comprise, in weight %: component A: 10-95%, preferably 30-80%, most preferably 50-70%; component B: 5-60%, preferably 10-50%, most preferably 20-50%; and optionally at least one other polymer component C: 2-40%, preferably 5-20%, most preferably 10-15%.

For purposes of illustration and not limitation, an exemplary fugitive pattern material that comprises ethylene/styrene interpolymer (ESI) as component A in an amount of about 60 weight % of the pattern material and a low molecular weight polystyrene as component B in an amount of about 40 weight % of the pattern material provides a combination of pattern properties suitable for use in making mold assembly 30 for use in the lost wax investment casting process as described above. Such pattern material exhibits a pattern shrinkage rate suitable for fast, low cost injection molding with essentially defect-free visual surface quality; improved pattern mechanical properties to maintain pattern dimensional stability to meet 6-sigma manufacturing requirements in an automated assembly and shell mold-making operation; suitable melting temperature, melt flow rate, and thermal expansion coefficient to permit pattern removal from the shell mold using conventional rapid pattern thermal removal techniques without mold splitting or cracking; and clean burnout (low ash and no trace metals) from the shell mold.

EXAMPLES

Preparation of Ethylene/Styrene Interpolymer (ESI-1) Used in Examples

The ESI-1 interpolymer was prepared in a continuously operating loop reactor. An Ingersoll-Dresser twin screw pump provided the mixing. The reactor ran liquid full at 475 psig (3,275 kPa). Raw materials and catalyst/cocatalyst flows were fed into the reactor through injectors and Kenics static mixers in the loop reactor piping. From the discharge of the loop pump, the process flow goes through two shell and tube heat exchangers before returning to the suction of the loop pump. Upon exiting the last exchanger, loop flow returned through the injectors and static mixers to the suction of the pump. A second monomer/feed injector and mixer was used if available. Heat transfer oil or tempered water was circulated through the exchangers' jacket to control the loop temperature. The exit stream of the loop reactor was taken off between the two exchangers. The flow and solution density of the exit stream was measured by a Micro-Motion™ mass flow meter.

Solvent was injected to the reactor primarily as part of the feed flow to keep the ethylene in solution. A split stream from the pressurization pumps prior to ethylene injection was taken to provide a flush flow for the loop reactor pump seals. Additional solvent is added as a diluent for the catalyst. Feed solvent was mixed with uninhibited styrene monomer on the suction side of the pressurization pump. The pressurization pump supplied solvent and styrene to the reactor at approximately 650 psig (4,583 kPa). Fresh styrene flow was measured by a Micro-Motion™ mass flow meter, and total solvent/styrene flow was measured by a separate Micro-Motion™ mass flow meter. Ethylene was supplied to the reactor at approximately 690 psig (4,865 kPa). The ethylene stream was measured by a Micro-Motion™ mass flow meter. A flow meter/controller was used to deliver hydrogen into the ethylene stream at the outlet of the ethylene control valve.

The ethylene/hydrogen mixture is at ambient temperature when it is combined with the solvent/styrene stream. The temperature of the entire feed stream as it entered the reactor loop was lowered to approximately 2° C. by a glycol cooled exchanger. Preparation of the three catalyst components took place in three separate tanks. Fresh solvent and concentrated catalyst/cocatalyst/secondary co-catalyst premix were added and mixed into their respective run tanks and fed into the reactor via a variable speed Pulsafeeder™ diaphragm pumps. As previously explained, the three component catalyst system entered the reactor loop through an injector and static mixer into the suction side of the twin screw pump. The raw material feed stream was also fed into the reactor loop through an injector and static mixer upstream of the catalyst injection point or through a feed injector/mixer between the two exchangers, if available.

Polymerization was stopped with the addition of catalyst kill (water) into the reactor product line after the Micro-Motion™ mass flow meter measuring the solution density. A static mixer in the line provided dispersion of the catalyst kill and additives in the reactor effluent stream. This stream next entered post reactor heaters that provided additional energy for the solvent removal flash. This flash occurred as the effluent exited the post reactor heater and the pressure was dropped from 475 psig (3,275 kPa) down to approximately 450 mmHg (60 kPa) of absolute pressure at the reactor pressure control valve.

This flashed polymer entered the devolatilization section of the process. The volatiles flashing from the devolatilization were condensed with a glycol jacketed exchanger, passed through vacuum pump, and were discharged to vapor/liquid separation vessel. In the first stage vacuum system, solvent/styrene were removed from the bottom of this vessel as recycle solvent while unreacted ethylene exhausted from the top. The ethylene stream was measured with a Micro-Motion™ mass flow meter. The measurement of vented ethylene plus a calculation of the dissolved gases in the solvent/styrene stream were used to calculate the ethylene conversion. The polymer and remaining solvent was pumped with a gear pump to a final devolatilizer. The pressure in the second devolatilizer was operated at approximately 10 mmHg (1.4 kPa) absolute pressure to flash the remaining solvent. The dry polymer (<1000 ppm total volatiles) was pumped with a gear pump to an underwater pelletizer was then spin-dried, and collected. The preparation conditions and properties of ESI-1 are summarized in Tables 1' and 2' respectively.

TABLE 1'

Preparation Conditions for ESI 1

| ESI # | Reactor Temp ° C. | Solvent Flow lb/hr | Ethylene Flow lb/hr | Hydrogen Flow lb/hr | Styrene Flow lb/hr | Ethylene Conversion % | B/Ti Molar Ratio | MMAO[c]Ti Molar Ratio | Catalyst[a] | Co-Catalyst[b] |
|---|---|---|---|---|---|---|---|---|---|---|
| ESI-1 | 69.0 | 20,945 | 1,116 | 0.0924 | 4,533 | 97.2 | 1.20 | 7.9 | A | B |

[a]Catalyst A is (1H-cyclopenta[1]phenanthrene-2-yl)dimethyl(t-butylamido)-silanetitanium 1,4-diphenylbutadiene) prepared as described in Example 3 of USP No. 6,150,297, incorporated herein by reference.
[b]Cocatalyst B is bis(hydrogenated-tallowalkyl)methylammonium tetrakis(pentafluorophenyl)borate prepared as described in Example 2 of USP No. 5,919,983, incorporated herein by reference.
[c]a modified methylaluminoxane commercially available from Akzo Nobel as MMAO-3A (CAS# 146905-79-5)

TABLE 2'

ESI-1 Properties

| Designation | Melt Flow Rate (dg/min)* | Copolymer styrene (wt %) | Copolymer styrene (mol %) | Copolymer ethylene (wt %) | Copolymer ethylene (mol %) |
|---|---|---|---|---|---|
| ESI-1 | 6.5 | 77 (min) | 47 (min) | 23 (max) | 53 (max) |

*ASTM D1238 (190° C./2.1 Kg, I2)

Blend Preparation

All blends were first dry blended thoroughly before compounding. A Haake Polylab system equipped with a Berstorff PTW/25P twin screw extruder was used for compounding. Typical extruder temperature was 160-190° C. at an output rate of 12-22 lbs/hr. The water bath temperature was 5° C. The composition of the blends is expressed as weight % based on the total weight of the blend components.

Test Methods.

Styrene Analyses of ESI Sample

Interpolymer styrene content and atactic polystyrene concentration were determined using proton nuclear magnetic resonance ($^1$H N.M.R) as described in U.S. Pat. No. 6,476,141, the entire contents of which are herein incorporated by reference.

Melt Temperature:

The melting temperature of the pattern material blends was determined by differential scanning calorimeter (DSC) in accordance with ASTM: D3418 procedure where $T_m$=melting temperature (measured at peak), $\delta T$=width of melt zone, and $\delta H_{fus}$=Latent heat of Fusion.

Melt Flow Rate (MFR) Measurements:

The MFR of the pattern material blends was determined in accordance with ASTM: D1238 procedure.

Molecular Weight

Unless otherwise stated, the molecular weight of the polymer compositions for use in the present invention is conveniently indicated using a melt index measurement according to ASTM D-1238, Condition 200° C./5 kg (and also known as $I_5$).

Expansion Coefficient—Thermal Mechanical Analysis (TMA)

The Expansion Coefficient was measured using ASTM E831 procedure where:

$T_s$=softening temperature (start of probe penetration), $T_m$=melt temperature by Onset (tangent intercept), $\epsilon$=Strain of Expansion $((t_{exp}-t_{init})/t_{init}) \times 100$, $CTE_{(max\ exp)}$=Thermal Expansion coefficient (from 0 degrees C. to maximum expansion, $CTE_{(max\ slope)}$=Thermal Expansion coefficient (maximum slope)

$\delta T_{(10-30\%\ pen)}$=Temperature range (from 10 to 30% probe penetration), $\delta T_{(Tm-30\%\ pen)}$=Temperature range (from Melt Temperature by Onset to 30% probe penetration).

CTE (Max. Expansion)

The CTE (max. expansion) was measured using ASTM E831 procedure.

The Dimensional Variation (I-Beam) Shrinkage Rate

Figure 4A:
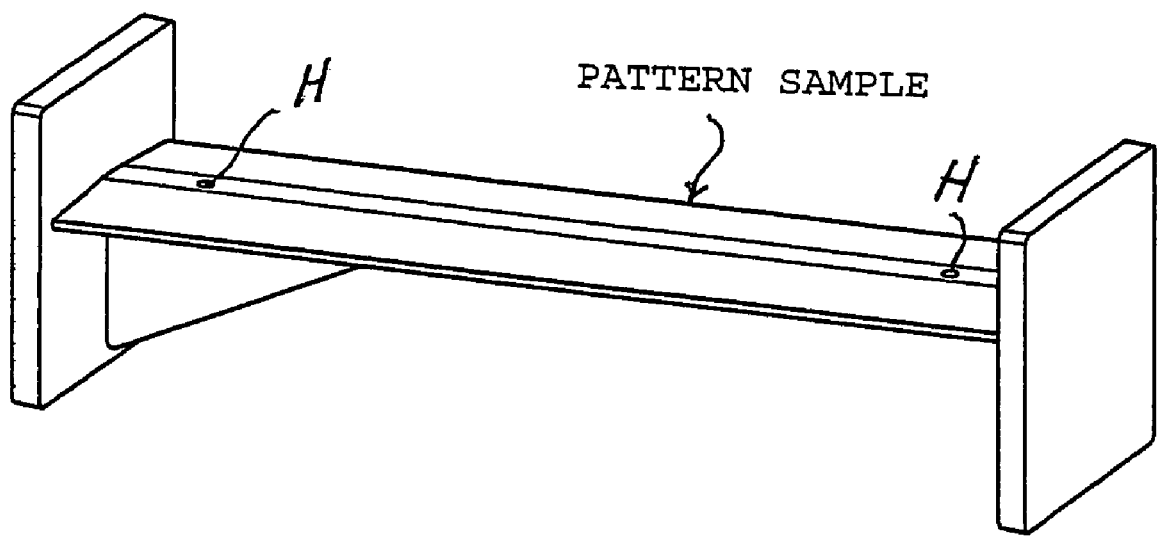
FIGS. 4A and 4B is a perspective view of an I-beam sample used for measuring dimensional variation.
Figure 4B:
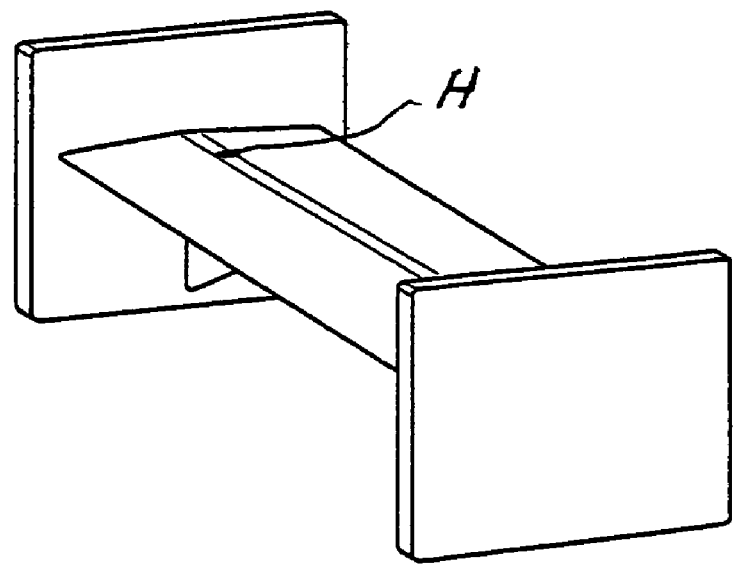
Figure 4C:
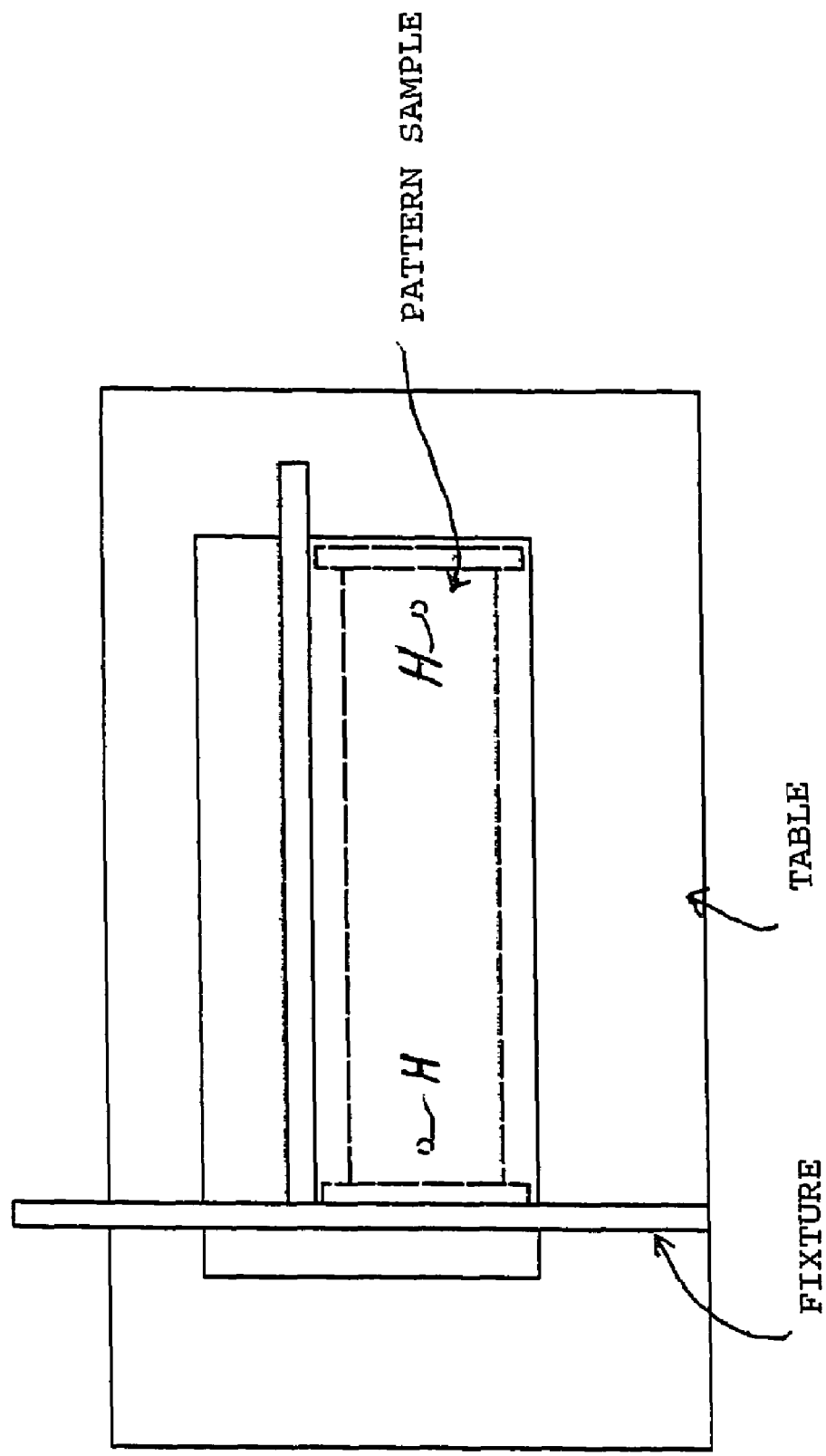
FIG. 4C is a plan view of a holder for the I-beam sample.

The Dimensional Variation was measured using an I-beam pattern samples shown in FIGS. 4A and 4B injection molded of a pattern material pursuant to the invention that comprised the 60 weight % ethylene/styrene interpolymer (ESI) as component A and 40 weight % low molecular weight polystyrene as component B (such a pattern material being designated as CASPER). (For comparison, similar I-beam pattern samples were injection molded of polystyrenes currently used in commercial fabrication of fugitive patterns from different sources (Lacqrene 1541 polystyrene from the Atofina division of TotalFinaElf and high flow crystal polystyrene PS-541 from Deltech Polymers Corp.) and from two different conventional pattern wax blends (designated 5042 and 5038). The pattern dimensional shrinkage was measured on an Optical Gauging FOV Smart Scope (OGP), or similar optical measurement device using the following procedure. A T-shaped fixture for the I-beam pattern was secured in position on the OGP table as shown in FIG. 4C. Each I-beam pattern sample was positioned in the holder with the pattern target holes H in the flat section facing up and the thick end (0.0250 inch dimension) of the I-beam pattern sample on the right hand side of the holder. The OGP lighting was adjusted with the "Back and AUX" lighting off and "Ring" light at a value of ten to obtain good lighting contrast. To increase, visibility of the edge of the holes H, a black highlighter or white paint may be applied to the flat section of the sample. The OGP table then is moved until the left end of the I-beam pattern is under the optics so that the optics can be focused on flat section near the left-hand hole H. A working magnification of 35× is set in the optics. The circle reticle of the optical scope is set over the left-hand sample hole H by moving the OGP table, and then the reticle is fit to the hole H. The X, Y, and Z coordinates are zeroed on the left measurement hole H. The OGP table then is moved to align the right-hand hole H of the sample with the circle reticle. The measurement axes are aligned with the right-hand hole. The distance between the center points of the two holes H is measured. For each sample group, statistics were calculated for the mean, maximum value, minimum value, standard deviation, signal-to-noise ratio, Nominal The Best (NTB), percent shrink, shrink inch per inch, and sample size (number of samples tested).

Flex Modulus

The flex modulus was measured using ASTM D-790.

Ultimate Tensile Strength

Ultimate tensile strength was measured using ASTM D638.

Injection Molding

Injection molding of specimens was conducted on a Fanuc Roboshot EV110 ton injection molding machine. Injection cycle time was 30 seconds for specimens made of polystyrene material and ESI blend materials, and 60 seconds for specimens made of pattern wax. The wax specimens were injection molded at a temperature in the range of 140 to 160 degrees F. and pack pressure of 150 to 200 psi depending on specimen geometry. The polystyrene specimens were injection molded at a temperature in the range of 390 to 550 degrees F. and pack pressure of 6000 to 10,000 psi depending on specimen geometry. The ESI blend specimens [other than experiment (material) no. 5 of Table 1 desginated CASPER material] were injection molded at a temperature in the range of 235 to 330 degrees F. and pack pressure of 3500 to 11000 psi depending on specimen geometry. The CASPER blend specimens (experiment material no. 5 of Table 1) were injection molded at a temperature in the range of 260 to 290 degrees F. and pack pressure of 6500 to 8000 psi depending upon specimen geometry (i.e. I-beam, tensile bar, wedge test specimen).

Burnout Performance

Figure 5B:
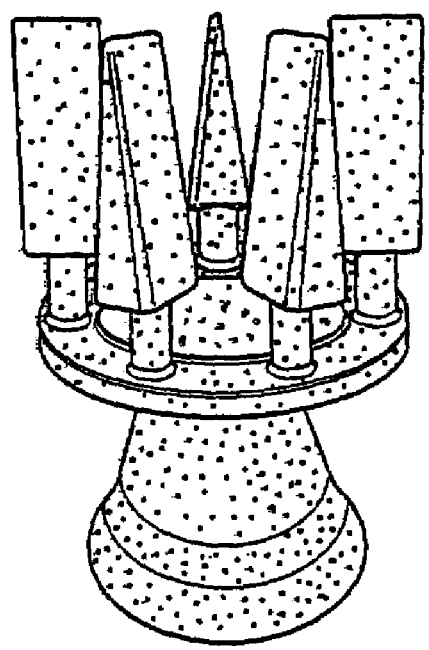
FIG. 5B is a perspective view of the pattern assembly invested in a shell mold oriented for flash dewaxing.
Figure 5A:
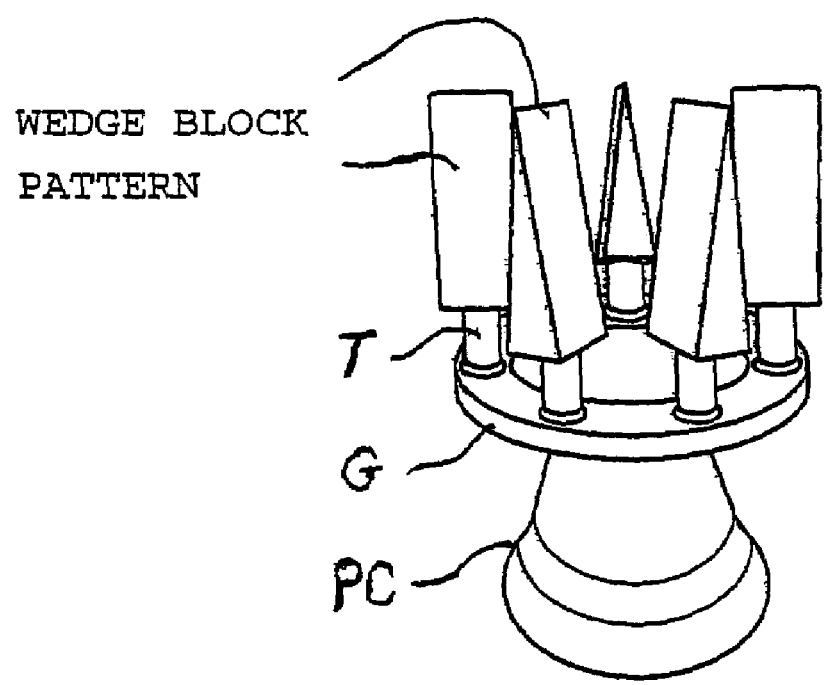
FIG. 5A is a perspective view of a pattern assembly of wedge shaped patterns.

The Burnout Performance (susceptibility to mold splitting) was evaluated during pattern removal by flash dewaxing using a wedge block pattern, FIG. 5A. This wedge shaped pattern can often cause shell mold cracking along the edges of the wedge. Test wedge shaped shell molds were assembled using the different pattern material blends for each wedge block pattern. Each of six different wedge shaped patterns was connected to its own drain tube T and then mounted on a common ring gate G attached to a pour cup PC to form a pattern assembly, FIG. 5A. Each pattern assembly included a conventional wax wedge shaped pattern and polystyrene wedge shaped pattern as controls. Each pattern assembly was then invested in the same type of production DS/SC (directional solidification/single crystal) ceramic shell mold. The shell mold comprised a commercially used shell mold construction comprising a ceramic slurry/stucco facecoat formed using alumina and cobalt aluminate flours, four ceramic (zircon) slurry/stucco back-up layers and a slurry cover layer and were processed through burnout using production methods appropriate to pattern material type being evaluated. The shell molds (FIG. 5B) having pattern blends pursuant to the invention were flash heated in a gas fired tunnel kiln furnace at 1450 degrees F. The shell molds having only conventional wax patterns were subjected to a boilerclave to remove most wax followed by flash dewaxing in a gas fired tunnel kiln furnace at 1450 degrees F. The shell molds were visually inspected for mold split type, location (i.e. tip, side or face of wedge), and severity (length of split). The different pattern material blends were rated as worse than, equal to, or better than control wax pattern in terms of mold splitting during pattern removal.

The different pattern material blends using ESI-1 as Component A along with other blend components and tested are set forth in the Table 1 below and the results of the tests for these blends are set forth in Table 2 below:

TABLE 1

| Experiment Number: | ESI (Weight %) | Other Blended Components (Weight %) |
|---|---|---|
| 1 | 80% | 20% Piccolastic D125 |
| 2 | 60% | 40% Piccolastic D125 |
| 3 | 80% | 20% Piccolastic A75 |
| 4 | 70% | 30% Piccolastic A75 |
| 5 | 60% | 40% Piccolastic A75 |
| 6 | 80% | 20% WM5042 |
| 7 | 60% | 40% WM5042 |
| 8 | 95% | 5% paraffin wax 1278 |
| 9 | 90% | 10% paraffin wax 1278 |
| 10 | 80% | 20% paraffin wax 1278 |
| 11 | 95% | 5% stearic add |
| 12 | 90% | 10% stearic acid |
| 13 | 80% | 20% Piccolyte S125 |
| 14 | 80% | 20% Valtec HH442H |
| 15 | 90% | 10% EVA, Escorene |
| 16 | 80% | 20% Piccolastic A75 + 10% EVA, Escorene |
| Comparison Experiments: | | |
| 1 | 0% | Deltech, Crystal Polystyrene PS-541 |
| 2 | 0% | Atofina, Lacqrene Polystyrene 1541 |
| 3 | 0% | WM 5038 |
| 4 | 0% | WM 5042 |

TABLE 2

Mechanical Properties, Thermo-Mechanical Properties, and Burnout Performance

| | Ultimate Tensile (PSI) | Flex Modulus (KSI) | Ts (° C.) | Tm (° C.) | E Expansion Coefficient (%) | CTE Max. Expansion (μm/m/° C.) | CTE Max Slope (μm/m/° C.) | ΔT Tm to 30% Penetration | MFR (gm/10 Minute) | Burnout Performance |
|---|---|---|---|---|---|---|---|---|---|---|
| Experiment Number: | | | | | | | | | | |
| 1 | 2324 | 325.2 | | | | | | | | |
| 2 | 7342 | 309.7 | | | | | | | | |
| 3 | 2432 | 331.0 | 37 | 39 | 3.03 | 385 | 46 | 25 | 100 | Fair |
| 4 | 3008 | 338.8 | | | | | | | | |
| 5 | 5399 | 325.4 | 37 | 39 | 2.50 | 321 | 82 | 18 | 438 | Good |
| 6 | 2398 | 103.2 | 32 | 34 | 0.32 | 101 | 1216 | 64 | 167 | Fair |
| 7 | 1197 | | | | | | | | | |
| 8 | 1672 | | | | | | | | | |
| 9 | 2299 | 149.1 | 33 | 35 | 0.28 | 86 | 104 | 55 | 99 | Poor |
| 10 | 2544 | | | | | | | | | |
| 11 | 1741 | 144.4 | 34 | 35 | 0.87 | 129 | 131 | 35 | 60 | Poor |
| 12 | 2342 | | | | | | | | | |
| 13 | 4957 | 320.2 | 31 | 33 | 0.24 | 79 | 89 | 76 | 107 | Poor |
| 14 | 5126 | 304.4 | 31 | | 0.46 | 55 | 208 | 73 | 76 | Poor |
| 15 | 2956 | 202.8 | | | | | | | | |
| 16 | 1645 | 247.5 | 39 | | | | | | | |
| Comparison Experiments: | | | | | | | | | | |
| 1 | 6050 | 440.0 | 83 | 89 | 0.74 | 89 | 132 | 61 | 22 | Very Poor |
| 2 | 6092 | 420.6 | 84 | 92 | 0.73 | 87 | 132 | 56 | 18 | Very Poor |
| 3 | 679 | 1.1 | 51 | 41 | 0.76 | 24 | 278 | 14 | >10,000 | Good |
| 4 | 556 | 0.9 | 39 | 58 | 0.54 | 105 | 210 | | >10,000 | Good |

TABLE 3

Dimensional Analysis
Distance Between I-Beam Pattern Targets

|  | Mean | Maximum | Minimum | Standard Deviation | S/N Ratio Nominal-the Best | Percent Shrink | Shrink inch/inch |
|---|---|---|---|---|---|---|---|
| Experiment Number: | | | | | | | |
| 5 | 5.4935 | 5.4946 | 5.4926 | .0005 | 81.0 | 0.1175 | .0012 |
| Experiment Comparisons: | | | | | | | |
| 1 | 5.4862 | 5.4873 | 5.4849 | .0007 | 78.0 | 0.2508 | .0025 |
| 2 | 5.4849 | 5.4855 | 5.4842 | .0003 | 84.2 | 0.2740 | .0027 |
| 3 | 5.4774 | 5.4861 | 5.4735 | .0032 | 64.8 | 0.4110 | .0041 |
| 4 | 5.4749 | 5.4778 | 5.4727 | .0017 | 70.4 | 0.4570 | .0046 |

Note:

Comparison Experiment 1 is the high flow PS-541 polystyrene from Deltech Polymers Corp. Comparison Experiment Ex 2 is the high flow Atofina Lacqrene 1541 polystyrene, while Comparison Experiment 3 and 4 each is a conventional pattern wax material (WM5042 and WM5038) produced by Howmet Castings Corporation.

Piccolastic™ A-75 is a low molecular weight polystyrene from Eastman/Hercules Chemical, Piccolyte™ S-125 is a low molecular weight resins derived from poly-beta-pinene from Eastman/Hercules Chemical, Escorene™ is an ethylene-vinyl-acetate copolymer from ExxonMobil Chemical, WM5042 is a conventional pattern wax material produced by Howmet Castings Corporation, Paraffin Wax 1278 is a special blend paraffin wax obtained from The International Group, Incorporated, Valtec™ is a high flow polypropylene from Basell North America, Incorporated.

Burnout performance as presented in Table 2 is the ability of the pattern material to be removed from a green shell mold without imparting defects such as shell mold cracks, splits, and spall, facecoat reactions, or casting inclusions. Burnout quality is affected by many thermo-mechanical material properties including, but not limited to, softening temperature ($T_s$), melt temperature ($T_m$), expansion coefficient (%), CTE (maximum expansion and maximum slope), and melt flow rate (MFR). Industry experience shows that pattern materials with low values of $T_s$, $T_m$, and expansion coefficients together with high MFR perform best in burnout. Pattern materials with softening and melt temperatures greater than 100 degrees C. and/or expansion greater than 3.0% usually produce shell defects due to the inability to quickly reach melt temperature and flow out of the green shell mold before expansion results in shell mold splits or cracks. MFR is an equally important material property influencing thermal-based pattern removal processes. For example, the melted pattern material must have the ability to flow rapidly out of a heated shell mold once melted to prevent defects caused by internal pressure from expanding liquid pattern material. An MFR of less than 350 has been found to be unacceptable in commercial production burnout processes since the pattern material remains in the shell mold too long.

Table 2 reveals that for ESI pattern material blends tested for all properties listed in the table, the blends of Experiment Numbers 3, 5, and 6 exhibit $T_s$ and $T_m$ comparable to or less than conventional pattern wax materials (Comparison Experiments 3 and 4) with fair to good burnout performance. Such ESI pattern material blends of Experiment Numbers 3, 5, and 6 also exhibit MFR much higher than polystyrene pattern materials (Comparison Experiments 1 and 2). For experimental CASPER blend 5 (Experiment Number 5), the MFR was greater than 10 times that of polystyrene, that will provide increased flow of melting pattern material during the pattern removal process using thermal treatment such as flash heating or steam autoclaving.

The combined effects of low melt temperatures, low expansion, and high MFR of the pattern material blends of Experiment Numbers 3, 5, and 6 result in burnout properties equal to pattern wax materials and much better than polystyrene pattern materials. These pattern material blends pursuant to the invention can achieve burnout performance at a Fair to Good Level similar to pattern wax materials and reduce or eliminate shell related defects that are common to polystyrene pattern materials.

In addition to burnout performance, mechanical properties are key to economical functioning of pattern materials. Conventional pattern wax materials are very weak and brittle, making them fragile and prone to handling damage during assembly of a pattern assembly, and not readily adaptable to automation. Conversely, polystyrene pattern materials have high strength and toughness. Patterns made from polystyrene pattern materials are robust to handling forces in assembly and shell processes and can be used in complex pattern designs, such as turbine wheel products and as thin assembly components, such as gates, downfeeds, sprues and crystal starters where high strength and rigidity is required during the shell building process.

Table 2 presents a comparison of key mechanical properties for the ESI pattern material blends relative to conventional pattern wax materials and polystyrene materials. Data for ultimate tensile strength and flex modulus (which is a measure of toughness) shows that the ESI pattern material blends of Experiment Numbers 3, 5, and 6 have about 3 to about 10 times higher tensile strength and much greater flex modulus properties as compared to pattern wax while exhibiting the above-described advantageous properties.

For ESI pattern material blends tested for all properties listed in the Table 2, the CASPER blend of Experiment Number 5 is generally similar to polystyrene pattern materials in strength and toughness. In applications where a polystyrene pattern material is selected for use based on mechanical properties, for example, a turbocharger wheel pattern or large casting gating components, the CASPER blend of Experiment Number 5 pursuant to the invention comprising 60 weight % ESI and 40 weight % low molecular weight polystyrene (Picolastic A75) may serve as a direct replacement.

As a result of its good burnout performance and mechanical properties, the dimensional characteristics, shrink and variability of the CASPER blend of Experiment Number 5 comprising 60 weight % ESI and 40 weight % low molecular weight polystyrene (Picolastic A75) were evaluated. For comparison, two polystyrene pattern materials (Deltech PS-541 and Atofina 1541) and two conventional pattern wax materials (WM5038 and WM5042) were also evaluated for dimensional characteristics.

Pattern dimensional evaluations were conducted on measurements of the distance between target holes using I-beam patterns as shown in FIGS. 4A and 4B. The measurement methods, tools, fixtures, and equipment are described above in the section entitled Test Methods. In this evaluation and analysis, all patterns were molded on a 100 ton vertical electric injection molding machine using a temperature controlled tool with full auto-ejection. The injection process was a standard decoupled two-stage cycle similar for each pattern material except for material temperature and pack pressure. Material temperature and pack pressure was adjusted for each pattern material to optimize pattern visual quality.

Table 3 presents a summary of statistical results for the evaluation and analysis of dimensional characteristics. Shrink is evaluated using mean percent shrink and shrink inch/inch statistics. Dimensional variation is evaluated with maximum, minimum, standard deviation, and S/N ratio nominal—the best statistics. As shown, shrink for the I-beam patterns made of the CASPER blend of Experiment Number 5 pursuant to the invention is significantly less than that for I-beam patterns made of the polystyrene and conventional wax pattern materials. This characteristic may affect pattern tool design without increasing costs for use in investment casting process. More importantly, the dimensional variation for the I-beam patterns made of the CASPER blend is equal to that for I-beam pattern made of the conventional polystyrene pattern material and 3 to 6 times less than that for pattern wax materials. As presented, the standard deviation of 5.500 inch I-beam feature is 0.0005 inch for the CASPER blend I-beam pattern compared to 0.0017 and 0.0032 for I-beam patterns made of wax materials 5042 and 5038, respectively. The CASPER blend pursuant to the invention will provide all the advantages of rigid polystyrene pattern material in terms of room temperature strength, dimensional stability, and greatly reduced dimensional variability as compared to pattern wax materials.

A preferred pattern material pursuant to the invention comprises about 50 to about 70 weight % ESI and about 20 to about 50 weight % low molecular weight polystyrene.

In summary, pattern material blends pursuant to the invention can perform similarly to conventional pattern waxes in pattern burnout without shell cracking. The pattern material blends pursuant to the invention also can have the following advantages over conventional pattern wax:

- injection moldable over a wider temperature/pressure range, 70-200 degrees C./100-2000 psi as compared to 70 degrees C./100 psi for conventional pattern wax materials,
- faster injection cycle time,
- improved dimensional stability,
- higher tensile strength for excellent adaptability to automated patten assembly, and significantly less dimensional variation.

Although the present invention has been described in detail in connection with certain embodiments thereof to make a pattern, pattern assembly as well as assembly components (e.g. gates, sprues, etc.) for investment casting a metal or alloy, the invention is not so limited and can be practiced to make other types of fugitive patterns for casting a metal or alloy. For example, the invention can be practiced to make a fugitive pattern for lost foam casting where the pattern is placed in a bed of refractory particles and molten metal or alloy is caused to flow in contact with the pattern to destroy (e.g. vaporize) and replace the pattern in the bed of refractory particulates. The blend of the substantially random interpolymer (component A), the low molecular weight polymer (component B), and the optional thermoplastic polymer (component C) will be selected to provide pattern properties suitable for the lost foam casting process such as low density, high tensile strength and low ash.

Although the present invention has been described in detail in connection with certain embodiments thereof, the invention is not so limited, and those skilled in the art will appreciate that changes, modifications and the like can be made therein within the scope of the invention as set forth in the appended claims.

We claim:

1. A fugitive pattern having a shape of an article to be cast from a metal or alloy, comprising a pattern material comprising A) a substantially random interpolymer prepared by polymerizing one or more α-olefin monomers with one or more vinyl or vinylidene monomers and B) a low molecular weight polymer other than said interpolymer.

2. The pattern of claim 1 having an injection molded shape of said article.

3. The pattern of claim 1 wherein said shape comprises a gas turbine blade or vane.

4. The pattern of claim 1 having reduced dimensional variation as an I-beam pattern shape as compared to a wax pattern as an I-beam pattern shape.

5. The pattern of claim 1 having higher strength as compared to a wax pattern.

6. The pattern of claim 1 having higher toughness as expressed by less brittleness as compared to a wax pattern.

7. The pattern of claim 1 having a melt flow rate of 350 or greater by ASTM D1238.

8. The pattern of claim 1 having a lower shrink as compared to a wax pattern and a polystyrene pattern.

9. The pattern of claim 1 wherein said interpolymer comprises ethylene/styrene interpolymer.

10. The pattern of claim 9 wherein said low molecular weight polymer comprises low molecular weight polystyrene.

11. The pattern of claim 1 further including a thermoplastic polymer other than said interpolymer and said low molecular weight polymer.

12. A fugitive pattern having a shape of an article to be cast from a metal or alloy, comprising a pattern material comprising A) a substantially random interpolymer and B) a low molecular weight polystyrene.

13. A fugitive pattern having a shape of an article to be cast from a metal or alloy, comprising a pattern material comprising A) ethylene/styrene interpolymer and B) a low molecular weight polystyrene.

14. The pattern of claim 13 wherein said ethylene/styrene interpolymer is present in an amount of 10% to 95% by weight of said pattern material and said low molecular weight polystyrene is present in an amount of 5% to 60% by weight of said pattern material.

15. The pattern of claim 14 wherein said ethylene/styrene interpolymer is present in an amount of 30% to 80% by weight of said pattern material and said low molecular weight polystyrene is present in an amount of 10% to 50% by weight of said pattern material.

16. The pattern of claim 15 wherein said ethylene/styrene interpolymer is present in an amount of 50% to 70% by weight of said pattern material and said low molecular weight polystyrene is present in an amount of 20% to 50% by weight of said pattern material.

17. The pattern of claim 16 wherein said ethylene/styrene interpolymer is present in an amount of about 60% by weight of said pattern material and said low molecular weight polystyrene is present in an amount of about 40% by weight of said pattern material.

18. The pattern of claim 13 wherein the low molecular weight polystyrene has a molecular weight (Mn) <10,000.

19. The pattern of claim 18 wherein the average molecular weight is <5,000.

20. The pattern of claim 19 wherein the average molecular weight is <2,000.

* * * * *